United States Patent
Haupt et al.

(10) Patent No.: US 7,074,122 B2
(45) Date of Patent: Jul. 11, 2006

(54) AIR STREAM MIXING CONDUIT IN AN AIR HANDLING MODULE

(75) Inventors: Eric Keith Haupt, Livonia, MI (US); Michael James Nabors, Berlin, MI (US); Dennis Anthony Vermette, Westland, MI (US); Mehran Shahabi, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/980,260

(22) Filed: Nov. 3, 2004

(65) Prior Publication Data

US 2006/0094346 A1    May 4, 2006

(51) Int. Cl.
*F24F 13/04* (2006.01)

(52) U.S. Cl. .................. 454/156; 165/42; 454/261; 454/269

(58) Field of Classification Search ........... 454/121, 454/156, 159–161, 261, 266–269; 165/41–43
See application file for complete search history.

(56) References Cited

U.S. PATENT DOCUMENTS

| | | |
|---|---|---|
| 1,395,938 A | 11/1921 | Barcucci |
| 2,339,629 A | 1/1944 | Fischer, Jr. |
| 5,070,770 A | 12/1991 | Cassidy |
| 5,653,630 A | 8/1997 | Higashihara |
| 5,711,368 A | 1/1998 | Ito et al. |
| 5,927,380 A | 7/1999 | Scoccia |
| 5,934,361 A | 8/1999 | Parisi et al. |
| 5,967,890 A | 10/1999 | Loup et al. |
| 5,988,263 A * | 11/1999 | Schwarz ................. 165/41 |
| 6,019,163 A | 2/2000 | Saida et al. |
| 6,278,083 B1 | 8/2001 | Schwarz |
| 6,368,207 B1 | 4/2002 | McLaughlin et al. |
| 6,588,496 B1 | 7/2003 | Nakagawa et al. |
| 2004/0093884 A1 | 5/2004 | Seki et al. |
| 2004/0112075 A1 | 6/2004 | Kachi |
| 2005/0202775 A1* | 9/2005 | Han et al. .............. 454/156 |

FOREIGN PATENT DOCUMENTS

DE    3826182    10/1989

* cited by examiner

*Primary Examiner*—Gregory Wilson
(74) *Attorney, Agent, or Firm*—Brinks Hofer Gilson & Lione

(57) ABSTRACT

An air handling module for the air conditioning system of a motor vehicle is provided, including a housing having a first portion defining a first path and a second portion defining a second path and a conduit having first and second ends and an enclosed passageway there between. The conduit is positioned within the housing such as to at least partially connect the first path and the second path adjacent to the second end of the conduit.

22 Claims, 3 Drawing Sheets

AIR STREAM MIXING CONDUIT IN AN AIR HANDLING MODULE

BACKGROUND

1. Field of Invention

The present invention relates generally to a heating and cooling apparatus, and more specifically a heating, ventilation, and air conditioning system for the air conditioning of the interior of a motor vehicle.

2. Related Technology

Heating, ventilation, and air conditioning systems (HVAC systems) typically include an air path for hot air streams and an air path for cold air streams within the HVAC air handling module. The hot and cold air streams are typically in fluid communication with a heating element and a cooling element respectively to heat or cool air as desired. More specifically, the airflow enters the HVAC system and travels through the cooling element and becomes the cold air stream. A portion of the airflow then travels along a second air path through a heating element in order to become the hot air stream.

The hot and cold air streams combine to form a third, mixed air stream that flows into the vehicle interior compartment. By controlling the hot and cold air streams, a vehicle occupant is able to control the temperature of the mixed air stream as it enters the vehicle interior compartment. More specifically, the vehicle occupant controls the amount of air flowing through each of the two paths in order to control the temperature of the hot or cold combined air stream entering the vehicle interior compartment.

Delivering air streams having the vehicle occupants desired temperature to designated areas of the vehicle requires mixing of hot air streams and cold air streams in precise proportions. Moreover, to deliver substantially consistent temperatures to the different sections of the vehicle, such as floor vents, panel vents, defroster vents, and door vents, the hot and cold air streams must be sufficiently mixed to avoid undesirable temperature gradients within the combined air stream.

In addition to sufficiently mixing air streams in an HVAC system, it is also desirable to minimize unwanted environmental conditions, such as noise, vibration, or harshness (NVH), caused by the air flowing through the HVAC system. The problem of NVH is especially problematic at the point in the HVAC system where the various air streams mix, due to turbulent flow caused by one of the first or second air streams flowing past the air delivery mechanism of the other air stream.

Therefore, it is desirable to provide an assembly that provides a substantial mixture of hot and cold air streams while minimizing the NVH caused by such mixture.

SUMMARY

In one configuration of the present invention, an air handling module of a heating and cooling apparatus for the air conditioning of the interior of a motor vehicle is provided. The air handling module includes a housing defining a first path for receiving a first fluid, such as air heated by a heater located in the first path. Additionally, the housing defines a second path for receiving a second fluid, such as air cooled by an air cooling device located in the second path.

A conduit having first and second ends and an enclosed passageway there between is positioned within the housing such as to at least partially connect the first path and the second path. More specifically, the first end of the conduit extends across the first path to receive the hot air; and the second end of the conduit extends across the second path to deliver the hot air into the cold air. The area of the housing adjacent to the second end of the conduit defines a mixing area, where the hot and cold airflows are permitted to mix.

In one aspect of the present invention the conduit includes an arcuate outer surface to create a smooth airflow of the cold air travelling past the conduit outer surface. More specifically, the conduit defines a circular, oval, or airfoil shaped cross-section to further promote a smooth airflow. The smooth airflow minimizes pressure drops and minimizes noise, vibration, and harshness (NVH) from the air handling module.

Additionally, the second end of the conduit includes a centerpoint, defining the center of the hot airflow. In order to promote mixture of the hot and cold airflows, a central longitudinal axis of the second path generally intersects the centerpoint of the second end of the conduit. In order to further promote mixture of the hot and cold airflows, the second end extends substantially completely across a cross-section of the second path.

The second path extends past the conduit in a second path direction; causing the cold airflow to flow across the conduit surface in the second path direction. Additionally, the terminal edge of the second end of the conduit extends across the second path at an angle; causing the cold airflow to flow across the second end at a particular angle. In order to further promote mixing of the airflows, the second path direction and the second end direction are not parallel with each other. More specifically, if the second path direction and the second end orientation were parallel with each other, the hot airflow would be substantially delivered into a single portion of the cold airflow. As will also be discussed in further detail below, it is desirable that the second path direction and the second end direction are non-perpendicular to each other to minimize NVH. The relative angle between the second path direction and the second end direction is preferably between 10 degrees and 45 degrees; and more preferably the relative angle is substantially equal to 25 degrees. However, the direction of the second path is dependant on the orientation of the HVAC doors, as will be discussed further below.

The terminal edges of the first and second ends of the conduit are also preferably not parallel with each other. More specifically, the first and second ends of the conduit define an angle between 25 and 65 degrees with respect to each other, and more preferably define an angle substantially equal to 45 degrees.

In yet another aspect of the present invention, a bleed passage is between the first end of the conduit and a pivoting baffle in order to permit direct communication between the hot airflow and the cold airflow. The bleed passage reduces NVH by minimizing a whistle or "soda bottle" effect in the conduit during particular vehicle user settings. More specifically, during times when the vehicle user desires a low or a non-existent hot airflow, the minimal airflow through the conduit may cause a whistle or "soda bottle" tone. However, the bleed passage maintains airflow through the conduit during times of low or non-existent hot airflow; thus reducing tones.

Further objects, features and advantages of this invention will become readily apparent to persons skilled in the art after a review of the following description, with reference to the drawings and claims that are appended to and form a part of this specification.

DETAILED DESCRIPTION

Figure 1:
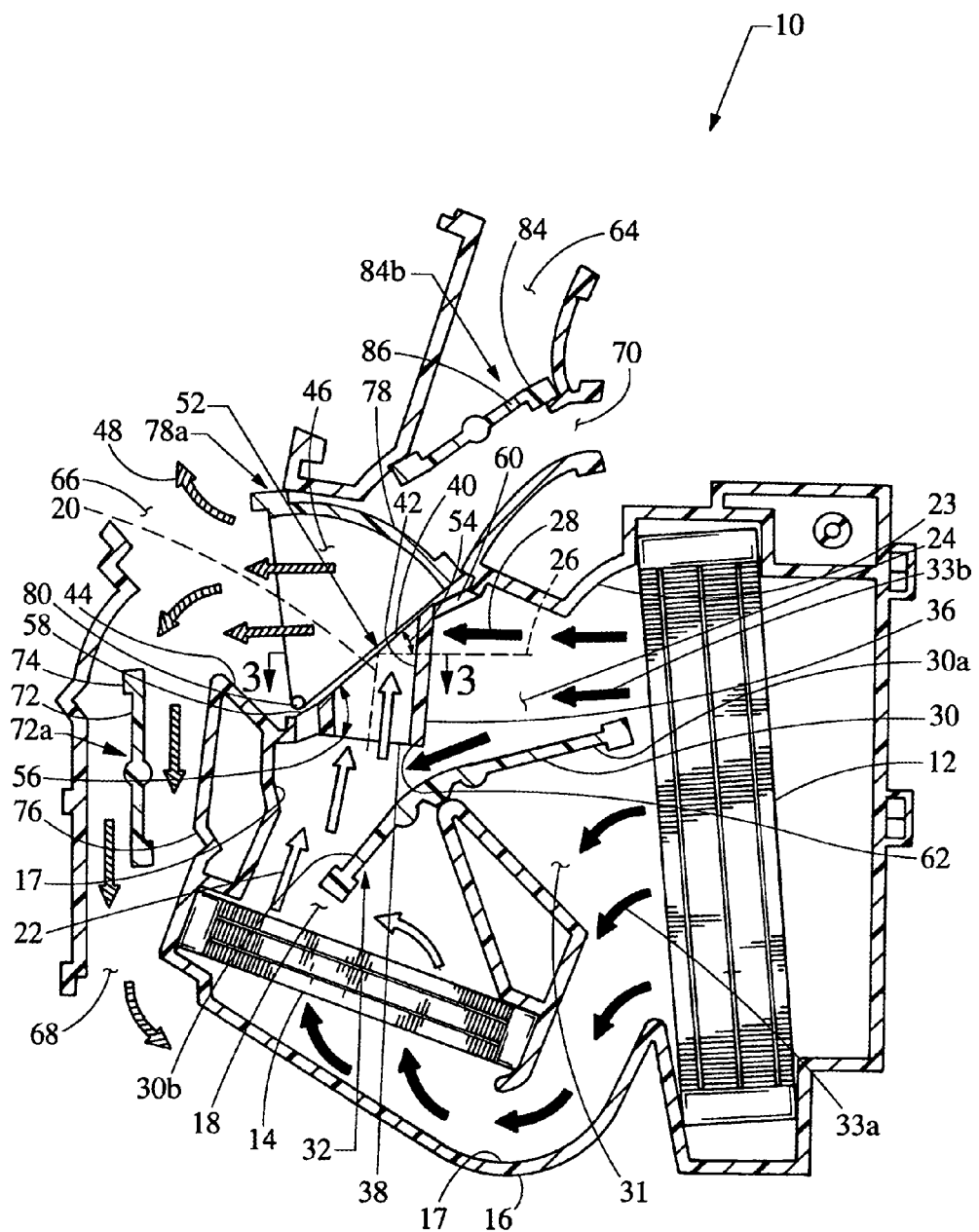
FIG. 1 is a cross-sectional view of a heating, ventilation, and air conditioning (HVAC) system having an air handling module and embodying the principles of the present invention, the HVAC system operating at a first temperature with ventilation doors in a first position.

Referring now to the drawings, FIG. 1 shows a heating, ventilation, and air conditioning (HVAC) system 10 having first and second temperature controlling devices, such as a cooler 12 and a heater 14, to cool or heat air before it is introduced into an interior of a motor vehicle (not shown). More specifically, ambient air is drawn into the HVAC system and is cooled, heated, or a combination thereof until it reaches the vehicle occupants' desired operating temperature. Alternatively, the HVAC system may draw air from a heated or a cooled source, such as from an area adjacent to the engine where air is heated by the engine during normal vehicle operation. In this alternative embodiment, a heater and/or a cooler may not be required.

The cooler 12 and heater 14 are contained within an air handling module 11 having a housing 16, composed of materials able to withstand a wide range of temperatures, such as plastic that has been molded or injected into duct components. The housing 16 defines a plurality of different flow paths that the air is directed to travel along. The different flow paths offer different amounts of heating and/or cooling. By controlling the airflow paths and mixing the hot and cool air streams, the vehicle occupants are able to control the temperature of the air as it enters the vehicle interior compartment.

FIG. 1 shows a first portion 17 of the housing 16 defining a first passageway 18 and a first flow path 20 extending through, or adjacent to, the heater 14. Therefore, hot airflow 22 travels along the first flow path 20. Likewise, a second portion 23 of the housing 16 defines a second chamber 24 and a second flow path 26 extending through, or adjacent to, the cooler 12. Therefore, cold airflow 28 travels along the second flow path 26.

An air diverting component, such as a pivoting baffle 30 having a first arm 30a and a second arm 30b, is located within the housing to control the volume of air flowing along the respective flow paths 20, 26 by pivoting between various positions. More specifically, when the pivoting baffle 30 is in an intermediate position 32, as shown in FIG. 1, some air is permitted to flow along the first flow path 20 and the remaining air is permitted to flow along the second flow path 26. Even more specifically, the first arm 30a of the pivoting baffle 30 extends towards the cooler 12 in order to separate the area adjacent to the cooler 12 into the second chamber 24 and an intermediate chamber 31. As shown in FIG. 1, a first portion 33a of the air leaving the cooler 12 is directed towards the first flow path 20 and a second portion 33b of the air leaving the cooler 12 is directed towards the second flow path 26, partly because of the baffle 30.

Figure 2:
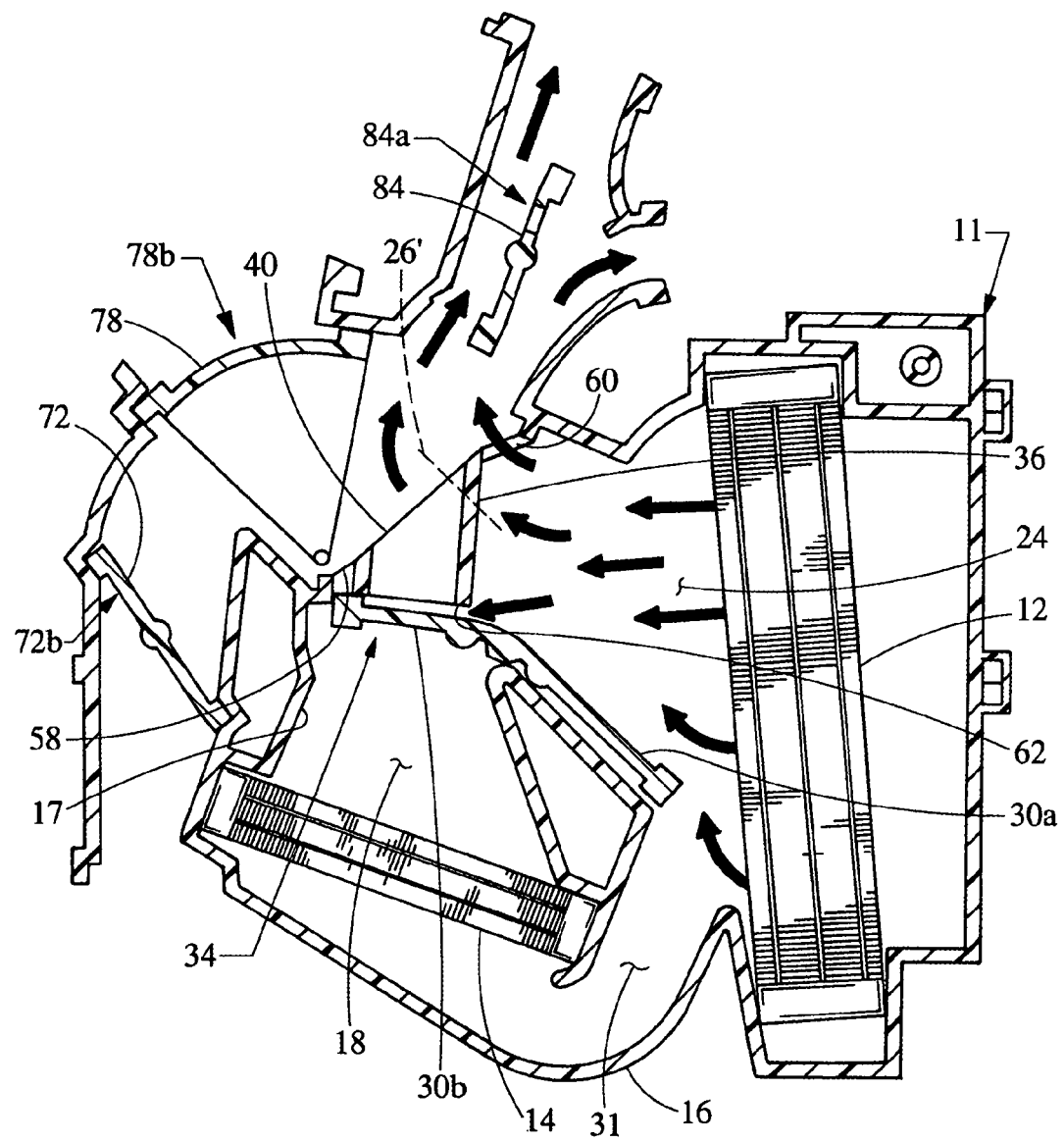
FIG. 2 is a cross-sectional view of the HVAC system shown in FIG. 1, with the HVAC system operating at a second, cooler temperature, with the ventilation doors in a second position.

Additionally, when the pivoting baffle 30 is rotated clockwise from the intermediate position 32 to a maximum cold air position 34, as shown in FIG. 2, the second arm 30b of the pivoting baffle 30 cooperates with the first portion 17 of the housing 16 to substantially prevent air from flowing out of the first chamber 18. As a result, most of the air entering the housing 16 flows along the second flow path 26 and the cold airflow 28 enters the vehicle interior compartment.

Conversely, when the pivoting baffle 30 is rotated counter-clockwise from the intermediate position 32 to a maximum hot air position (not shown) the first arm 30a of the pivoting baffle 30 cooperates with the second portion 23 of the housing 16 to substantially prevent air from flowing out of the second chamber 24. As a result, most of the air entering the housing 16 flows along the first flow path 20 and hot airflow 22 enters the vehicle interior compartment.

The housing also includes a conduit 36 having a first end 38, a second end 40, and an enclosed passageway 42 there between for receiving hot air and delivering the hot air into and across the cold air stream. More specifically, the first end 38 of the conduit 36 extends across the first flow path 20 to receive the hot air, and the second end 40 extends across the second flow path 26 to deliver the hot air into the stream of cold air. A portion 44 of the housing adjacent to the second end 40 of the conduit 36 defines a mixing chamber 46 where the hot and cold airflows are permitted to mix and create a mixed airflow 48.

The enclosed passageway 42 between the respective ends 38, 40 of the conduit 36 allows precise delivery of the hot airflow 22 into the stream of cold airflow 28. More specifically, the hot airflow 22 flows, undiluted, through the enclosed passageway 42 until reaching the desired delivery point at the second end 40 of the conduit 36. By delivering the substantially undiluted hot airflow 22 to the desired delivery point, the hot airflow 22 is more evenly mixed with the cold airflow 28. This precise delivery of the hot airflow 22 is more effective than a non-enclosed channel because a non-enclosed channel permits premature mixture of the airflows 22, 28, causing irregular temperature gradients.

Figure 3:
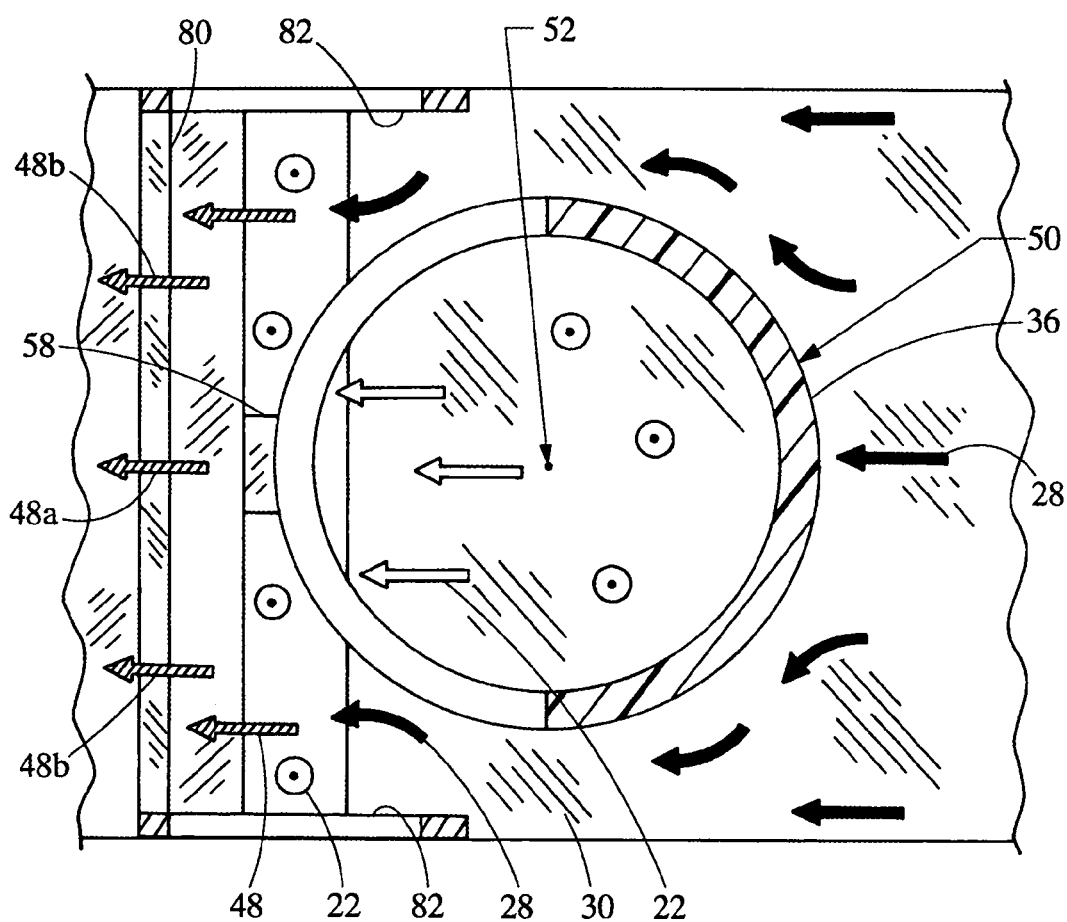
FIG. 3 is an enlarged cross-sectional view taken along the line 3—3 in FIG. 1, of the air conduit.

Referring now to FIG. 3, the conduit 36 includes an arcuate outer surface 50 to promote a smooth flow for the cold airflow 28 travelling past the conduit outer surface 50. More specifically, the conduit defines a circular, oval, or airfoil shaped cross-section to further promote a smooth airflow. The smooth airflow minimizes pressure drop in the cold airflow 28 as it flows across the conduit 36 and minimizes the noise, vibration, and harshness (NVH) originating within the housing 16.

The second flow path 26 shown in FIG. 1 defines a central longitudinal axis of the cold airflow 28. Additionally, the second end 40 of the conduit 36 includes a centerpoint 52, intersecting with the central longitudinal axis of the hot airflow 22 of the hot airflow. In order to promote a desired mixture of the hot and cold airflows 22, 28, the central longitudinal axis of the second flow path 26 generally intersects the centerpoint 52 of the second end 40 of the conduit 36. More specifically, the alignment of the central longitudinal axes of the respective airflows 22, 28 promotes an even mixture within in the mixed airflow central portion 48a (shown in FIG. 3) of the airflow.

In order to further promote mixture of the hot and cold airflows 22, 28, the terminal edge of the second end 40 extends substantially completely across the second flow path 26. More specifically, the extended second end 40 creates a large hot air delivery area and promotes an even mixture within in the mixed airflow outer portion 48b (shown in FIG. 3) of the airflow.

The second flow path 26 extends past the second end 40 of the conduit 36 at a relative angle 54. In order to promote airflow mixture, the relative angle 54 is not generally equal to 0 degrees. In other words, the second flow path 26 and the second end 40 are unparallel with each other to avoid a narrow hot air delivery area and to promote a consistently mixed airflow 48 temperature at the mixed airflow outer portion 48b, the mixed airflow central portion 48a, and all points in between.

Furthermore, it is desirable that the second flow path 26 and the terminal edge of the second end 40 of the conduit 36 are non-perpendicular to each other to minimize NVH and to maintain air exchange. More specifically, if the second end 40 of the conduit 36 opens towards the second chamber 24 and is perpendicular to the cold airflow 28, then the cold airflow 28 would cause undesirable NVH while flowing across the edge of the second end 40. Conversely, if the second end 40 of the conduit 36 opens away from the second chamber 24 and is perpendicular to the cold airflow 28, then the cold airflow 28 would not properly mix with the hot airflow 22.

The difference in the densities of the two airflows 22, 28 causes natural air currents adjacent to the second end 40, thus naturally mixing the airflows 22, 28. In order to maximize these natural air currents, the area of the hot airflow 22 is maximized at the second end 40. Therefore, the relative angle 54 between the second flow path 26 and the second end 40 of the conduit 36 is preferably greater than 45 degrees and less than 80 degrees when the HVAC system is in the orientation shown in FIG. 1. Even more preferably, the relative angle 54 is substantially equal to 65 degrees in the FIG. 1 orientation. However, the direction of the second path 26 varies depending on the orientation of the HVAC system.

More specifically, when the pivoting baffle 30 is rotated clockwise from the intermediate position 32 to a maximum cold air position 34, as shown in FIG. 2, the second path 26' of the relative angle between the second flow path 26' and the second end 40 of the conduit 36 is approximately equal to 80 degrees.

The first end 38 and the second end 40 of the conduit 36 are also preferably unparallel with each other. More specifically, the first and second ends 38, 40 of the conduit 36 define an angle 56 between greater than 25 degrees and less than 65 degrees. More preferably, the angle 56 is substantially equal to 45 degrees.

The conduit 36 is secured to the walls of the housing 16 by a first connector leg 58 and a second connector leg 60. The connector legs 58, 60 are thin components that extend from a portion of the conduit 36 such as to substantially avoid obstructing the airflow around the conduit 36. The connector legs 58, 60 and the conduit are a unitary, one-piece component made of plastic. Alternatively, the connector legs 58, 60 and the conduit may be integrally connected and may be composed of any suitable material. The connector legs 58, 60 are attached to the portion 44 of the housing 16 defining the mixing chamber 46 by any suitable means, such as by heat staking or by fasteners.

In order to further minimize the NVH originating from within the housing 16, a bleed passage 62 is defined by the first end 38 of the conduit 36 and the pivoting baffle 30 in order to permit direct communication between the hot airflow 22 and the cold airflow 28. The bleed passage 62 reduces NVH by minimizing a whistle or "soda bottle" effect in the conduit 36 during particular vehicle user settings. More specifically, during times when the vehicle occupant desires a low or a non-existent hot airflow 22, the lack of airflow through the conduit 36 may cause a whistle or "soda bottle" tone. However, the bleed passage 62 maintains airflow through the conduit 36 during times of low or non-existent hot airflow; thus reducing tones.

The HVAC system 10 further includes a plurality of movable doors to control the destination of the mixed airflow 48 within the vehicle interior compartment. More specifically, the HVAC system 10 in the Figures includes a defroster vent chamber 64 connected to a vehicle defroster (not shown) located adjacent to the windshield (not shown); a panel vent chamber 66 connected to vehicle panel vents (not shown) located in the instrument panel (not shown); a floor vent chamber 68 connected to vehicle floor vents (not shown) located adjacent to the floor of the vehicle interior compartment; and a demister vent chamber 70 connected to vehicle demister vents (not shown) located adjacent to the side windows (not shown) of the vehicle to prevent fogging.

The volume of the mixed airflow 48 entering each of the respective vent chambers 64, 66, 68, and 70 is controlled by a plurality of chamber doors. Positioned upstream from the floor vent chamber 68 is a pivotable floor vent door 72 having an open position 72a shown in FIG. 1 and a closed position 72b shown in FIG. 2. The floor vent door 72 includes sealing portions 74 to form a substantially fluid-tight seal with channels 76 in the housing 16 while in the closed position 72b. Alternatively, the floor vent door 72 may include a bleed hole (not shown) to permit airflow to the floor vent at all times.

A panel vent door 78 is positioned upstream from the panel vent chamber 66. The panel vent door 78 is pivotable to have an open position 78a shown in FIG. 1 and a closed position 78b shown in FIG. 2. More specifically, the panel vent door 78 is connected to a pivot stake 80 by pair of support plates 82, shown in FIG. 3, such as to be pivotable about the pivot stake 80. The panel vent door 78 also partially controls the amount of air permitted to enter the defroster vent chamber 64 and completely controls the amount of air permitted to enter the demister vent chamber 70.

A pivotable defroster vent door 84 is positioned upstream from the defroster vent chamber 64. The defroster vent door 84 includes an open position 84a shown in FIG. 2 and a closed position 84b shown in FIG. 1. Furthermore, the defroster vent door 84 includes a bleed hole 86 extending therethrough permitting air to bleed into the defroster vent chamber 64 even when the defroster vent door 84 is in the closed position 84b, thereby reducing windshield fogging.

It is therefore intended that the foregoing detailed description be regarded as illustrative rather than limiting, and that it be understood that it is the following claims, including all equivalents, that are intended to define the spirit and scope of this invention.

What is claimed is:

1. An air handling module for the air conditioning system of a motor vehicle, the module comprising:
    a housing including a first portion defining a first path and a second portion defining a second path; and
    a non-pivoting conduit including first and second ends and an undivided, unitary enclosed passageway therebetween, the conduit being positioned within the housing such that air in the first path passes through the passageway to the second end, and the housing directs air in the second path to pass over an outer surface of the conduit between the first end and the second end, the first path meeting the second path adjacent to the second end of the conduit.

2. An air handling module as in claim 1, wherein the conduit defines an arcuate outer surface.

3. An air handling module as in claim 1, wherein the enclosed passageway of the conduit defines a circular, oval or airfoil shaped cross-section.

4. An air handling module as in claim 1, wherein the second end includes a centerpoint and the second path includes a central longitudinal axis generally intersecting the centerpoint.

5. An air handling module as in claim 4, wherein the second end defies an outlet opening extending substantially completely across the second path.

6. An air handling module as in claim 1, wherein the second path extends past the conduit in a second path direction and the second end includes an outlet opening extending across the second path at an orientation that is nonparallel with the second path direction.

7. An air handling module as in claim 1, wherein the conduit defines a central longitudinal axis and the second end includes an outlet opening that extends across the central longitudinal axis of the conduit at an angle greater than 25 degrees and less than 65 degrees.

8. An air handling module as in claim 7, wherein the angle is substantially equal to 45 degrees.

9. An air handling module as in claim 1, wherein the first end and the second end of the conduit respectively define an inlet opening and an outlet opening that are unparallel to each other.

10. An air handling module as in claim 9, wherein the inlet opening of the first end and the outlet opening of the second end define an angle with respect to each other that is greater than 25 degrees and less than 65 degrees.

11. An air handling module as in claim 10, wherein the angle defined between the inlet and outlet openings is substantially equal to 45 degrees.

12. An air handling module as in claim 1, further comprising a bleed passage located adjacent to the first end of the conduit and forming a fluid communication between the first path and the second path.

13. An air handling module as in claim 1, wherein the first portion of the housing extends adjacent to a first temperature controlling device and the second portion of the housing extends adjacent to a second temperature controlling device.

14. An air handling module as in claim 13, wherein the first temperature controlling device is an air heating device and the second temperature controlling device is an air cooling device.

15. A heating and cooling apparatus for the air conditioning system of a motor vehicle, the heating and cooling apparatus comprising:
 a first temperature controlling device;
 a second temperature controlling device; and
 an air handling module having a first portion defining a first path and a second portion defining a second path, the first path adjacent to the first temperature controlling device and the second path adjacent to the second temperature device; and
 a non-pivoting conduit including first and second ends and an undivided, unitary enclosed passageway therebetween, the conduit being positioned within the housing such that air in the first path passes through the passageway to the second end and the housing directs air in the second path to pass over an outer surface of the conduit between the first end and the second end, the first path meeting the second path adjacent to the second end of the conduit.

16. A heating and cooling apparatus as in claim 15, wherein the conduit defines an arcuate outer surface.

17. A heating and cooling apparatus as in claim 15, wherein the second end includes a centerpoint and the second path includes a central longitudinal axis generally intersecting the centerpoint.

18. A heating and cooling apparatus as in claim 17, wherein the second end defines an outlet opening extending substantially completely across the second path.

19. A heating and cooling apparatus as in claim 15, wherein the first end and the second end respectively define an inlet opening and an outlet opening that unparallel to each other.

20. A heating and cooling apparatus as in claim 19, wherein inlet opening of the first end and the outlet opening of the second end define an angle with respect to each other that is greater than 25 degrees and less than 65 degrees.

21. A heating and cooling apparatus as in claim 20, wherein the angle defined between the inlet and outlet openings is substantially equal to 45 degrees.

22. A heating and cooling apparatus as in claim 15, further comprising a bleed passage located adjacent to the first end of the conduit and forming a fluid communication between the first path and the second path.

* * * * *